United States Patent [19]

Ladouceur

[11] Patent Number: 5,056,207
[45] Date of Patent: Oct. 15, 1991

[54] METHOD OF ATTACHING A SELF-PIERCING AND RIVETING FASTENER AND IMPROVED DIE MEMBER

[75] Inventor: Harold A. Ladouceur, Livonia, Mich.

[73] Assignee: Multifastener Corporation, Detroit, Mich.

[21] Appl. No.: 464,813

[22] Filed: Jan. 16, 1990

[51] Int. Cl.⁵ .............................................. B23P 11/00
[52] U.S. Cl. .................................. 29/432.2; 29/432.1; 29/512
[58] Field of Search ..................... 29/432.1, 432, 432.2, 29/512, 243.52; 227/51, 55, 59

[56] References Cited

U.S. PATENT DOCUMENTS

| | | | |
|---|---|---|---|
| 3,724,520 | 4/1973 | Ladouceur et al. | 29/432 X |
| 3,810,291 | 5/1974 | Ladouceur | 29/432 X |
| 4,018,257 | 4/1977 | Jack | 29/432 X |
| 4,064,617 | 12/1977 | Oaks | 29/432 X |
| 4,430,034 | 2/1984 | Fugikawa | 29/432 X |
| 4,610,072 | 9/1986 | Müller | 29/512 |
| 4,825,527 | 5/1989 | Ladouceur | 29/432 |

Primary Examiner—Timothy V. Eley
Attorney, Agent, or Firm—Dykema Gossett

[57] ABSTRACT

An improved die member and method of attaching a self-piercing and riveting fastener to a panel wherein a slug pierced from the panel by the riveting fastener is securely staked in the tubular riveting portion of the fastener during the installation of the fastener. The staking method includes shearing integral ribbons from the inside surface of the tubular barrel portion as the barrel portion is deformed radially outwardly in an annular die cavity of the die member. The integral ribbons are then preferably deformed radially inwardly in semicircular staking cavities defined through the free end of the central die post. In the most preferred method, radial tabs are simultaneously formed in the panel slug, which are deformed against an inside surface of the barrel portion, securely staking the slug in the tubular barrel portion and preventing inadvertent removal of the slug.

17 Claims, 4 Drawing Sheets

METHOD OF ATTACHING A SELF-PIERCING AND RIVETING FASTENER AND IMPROVED DIE MEMBER

BACKGROUND OF THE INVENTION

Self-piercing and riveting fasteners of the type disclosed in U.S. Pat. No. 4,555,838, assigned to the assignee of the present application, are now used in mass production applications, including automotive applications. In such mass production applications, the fasteners are normally installed in a die press capable of generating several tons of die force. The die press may be utilized to simultaneously form the panel into a configured shape, such as an automotive body component or structural support member, and install several riveting fasteners.

One or a plurality of installation heads are installed in one of the die platens of the die press, and the opposite die platen includes aligned riveting die members, commonly referred to as die buttons. The riveting fasteners are fed into the installation heads, generally through plastic tubes or chutes. The installation heads include a feed mechanism, which feeds a fastener to a plunger or punch, reciprocal in the installation head, to install a fastener in a panel located in the die press, with each stroke of the die press.

The self-piercing and riveting fasteners of the type described herein generally include a body portion and an integral tubular or annular barrel portion. In a stud-type fastener of the type disclosed, for example, in the above-referenced U.S. Pat. No. 4,555,838, the body portion of the fastener includes a radial flange integrally joined to the annular barrel portion opposite the free end and a stud portion integrally joined to the flange portion extending in coaxial alignment with the barrel portion. The free end of the tubular barrel portion is open and includes a piercing surface. The opposite end of the barrel portion is closed at the radial flange portion, forming a socket. The die button includes an annular concave die cavity surrounding a central die post. As disclosed, for example, in the above-referenced U.S. Pat. No. 4,555,838, the central die post includes a free end having a peripheral piercing surface and an outer surface which slopes radially outwardly into the annular concave die cavity.

A panel, such as a sheet steel panel or plate used for body panels and structural members by the automotive industry, is secured over the die member, preferably in a die press, as described above. The free end of the barrel portion is then driven into the panel in coaxial alignment with the central die post of the die button. The die post is configured to be received within the free end of the annular barrel portion. As the barrel portion is driven into the panel, the piercing surface at the free end of the panel pierces a slug from the panel, which is received on the free end of the die post of the die button. The barrel portion is then driven through the opening formed in the panel into the annular die cavity, radially deforming the free end of the barrel portion, riveting the barrel portion to the panel as described, for example, in the above-referenced U.S. Pat. No. 4,555,838.

When the self-piercing and riveting fastener of the type disclosed in the above-referenced patent was first introduced, several problems were experienced in producing a consistent, high-quality installation. A primary object of this fastening system is to provide a stud or nut-type fastener permanently installed in relatively thin metal panels, such as utilized by the automotive industry, which may have a thickness of 0.030 inches or less. In the most preferred embodiment of the self-piercing and riveting fastener, the tubular barrel portion is deformed radially outwardly in the annular concave die cavity into a U-shaped channel opening toward the body portion of the fastener, and the panel portion surrounding the pierced opening is simultaneously driven into the U-shaped channel and deformed to substantially fill the channel, forming a very secure mechanical interlock between the fastener and the panel. As the slug is pierced from the panel, the slug is received in the tubular barrel portion and finally driven to the bottom of the tubular barrel portion by the central post of the die button.

It was initially believed that the location of the slug in the tubular barrel portion was essential to prevent inward collapse of the barrel portion, as the barrel portion is deformed radially outwardly into the preferred U-shaped channel because of inwardly directed forces on the barrel portion as described, for example, in the '838 patent. Although the slug does support the barrel portion during radial deformation, it has been found that it is possible to form a secure installation without locating the slug in the barrel portion based upon improvements in the installation, as described below. Nevertheless, the preferred embodiment of the stud-type fastener and panel assembly includes the slug in the barrel portion, particularly in mass production installations, such as automotive applications. It is far easier to retain the slug in the assembly than find a way of removing the slug through the die button, for example. Further, it may not be possible to remove the slug in certain existing applications because of lack of access. In a typical automotive application, studs are attached to automotive structural components or panels in a die press, as described. Further, several studs may be installed simultaneously, and the die press preferably is run continuously during a production run. Therefore, a substantial volume of panel slugs must be removed from the die press area unless the slugs are retained in the assembly.

The initial problem with forming the preferred embodiment of the self-piercing and riveting fastener and panel assembly resulted from tolerance control and friction between the concave annular die cavity surface and the tubular barrel portion as the tubular barrel portion is initially deformed radially outwardly, as described in U.S. Pat. No. 4,825,525, assigned to the assignee of the present application. As described in this patent, the required installation force in a typical application is between about 10 and 20 tons. Particularly in mass production applications, orientation of the self-attaching element and die member and very close tolerances are critical to achieving a good installation. The installation force, which is composed of the forces required for piercing, forming of the barrel, and setting of the panel, results in very significant friction between the barrel portion of the fastener and the die cavity. The pressure between the internal surface of the tubular barrel portion and the die cavity may exceed 50 tons per square inch. The frictional forces generated by this pressure sometimes resulted in collapse of the barrel portion or stud, poor or incomplete installations and stress risers or faults, which significantly reduced the integrity of the joint assembly. These problems were, however, overcome by coating at least the internal surface of the barrel portion with a friction-resistant coating, preferably a fluorocarbon coating, such as an air-drying polytetrafluoroethylene lubricant, suspended in a fast-drying thermoplastic resin as disclosed in U.S. Pat. No. 4,825,525.

Substantial improvements in manufacturing tolerances and the use of a friction-resistant coating has resulted in more consistent installations, including an excellent mechanical interlock between the fastener barrel portion and the panel. In fact, the pull-out strength of a stud fastener as disclosed in the above-referenced U.S. patents may be greater than the tensile strength of the stud, in many applications. These improvements have, however, resulted in another problem, namely, the retention of the panel slug in the barrel portion. The panel slug may drop out of the barrel portion as the die press is opened or during assembly of the structural element to the panel on which the stud fastener is attached. Where the slug is released during installation of the stud-type fastener, the slug may remain on the center post of the female die member. When a second stud is then installed in a new panel received in the press, a slug is pierced from the panel and received over the die button center post, over the first slug. This results in damage to the installation head or deformation of the flange portion of the second stud, which may actually be sheared from the fastener by the installation plunger. Thus, it is very important to securely retain the panel slug in the barrel portion of the stud-type fastener during installation. The problem of retaining the slug in the barrel portion is particularly difficult where the panel is relatively thin, such as automotive applications where the panel metal may be less than 0.040 inches or less.

The problem of slug retention has been solved by the method of attaching a self-piercing and riveting fastener of this invention and the improved die button by securely staking the panel slug in the barrel portion. As will be understood, the slug must be retained in the barrel portion during installation, avoiding the necessity of a separate step. The method of this invention and the improved die button stakes the slug in the barrel portion during installation of the fastener in the panel, thus eliminating a separate step.

SUMMARY OF THE INVENTION

The method of attaching a self-piercing and riveting fastener of this invention includes staking the panel slug in the barrel portion during the installation step. As described, the fastener includes an annular barrel portion having a free open end and a piercing surface adjacent the free end. The method includes driving the fastener barrel portion free end against the panel, piercing a slug from the panel, and forming a panel opening. The barrel portion free end is then driven through the panel opening and is preferably deformed radially outwardly, riveting the barrel portion to the panel. The panel slug is simultaneously driven into the barrel portion through the open end, and in the most preferred embodiment an integral ribbon is sheared from an internal surface of the barrel portion, staking the panel slug in the barrel portion. In the most preferred method of this invention, a plurality of circumferentially spaced integral ribbons are sheared from the barrel portion inside surface which are deformed radially inwardly to securely stake the panel slug in the barrel portion. In the most preferred method of this invention, the panel is pierced in two stages, first along the barrel portion piercing surface, interrupted at locations adjacent the ribbons. Second, the panel is pierced at the ribbons preferably spaced radially outwardly of the barrel portion piercing surface to form spaced radial tabs on the panel slug. These tabs are then deformed into engagement with an internal surface of the barrel portion, securely staking the slug in the barrel portion. It is also anticipated that the slug tab staking may be used separately, particularly where slug retention requirements are less, such as installations in thicker panels.

As described in the above-referenced U.S. Pat. No. 4,555,838, the barrel portion of the stud-type fastener preferably includes a bottom wall spaced from the free end of the barrel portion, forming a socket. The preferred method then includes driving the panel slug toward the bottom wall and simultaneously deforming the ribbons radially inwardly, preferably against the slug to stake the slug against or adjacent the bottom wall of the barrel portion.

The improved die member or die button of this invention includes a plurality of circumferentially spaced cutting edges on the radially outwardly sloping outer surface of the die post. As described in the above-referenced U.S. patent, the preferred die button includes an annular concave die cavity surrounding a projecting central die post. The central die post has a free end which receives the panel slug and an outer piercing surface configured to be received in the open end of the barrel portion. The outer surface of the central die post slopes radially outwardly into the die cavity to receive the inner surface of the barrel portion and begin the radial outward deformation, which is completed in the annular concave die cavity.

In the most preferred embodiment of the die button, the outer surface of the die post includes a plurality of circumferentially spaced staking cavities which open radially outwardly. The staking cavities include a bottom wall which intersects the radially outwardly sloping outer surface of the side post, forming the cutting edges. The bottom wall preferably is angled radially upwardly toward the free end of the center post, providing sharp cutting edges. The inside surface of the staking cavities is preferably arcuate or most preferably semicircular and is angled inwardly toward the top or free end of the die post, forming a die release angle.

The most preferred method of this invention then includes deforming the integral ribbons cut from the inside surface of the annular barrel portion radially inwardly into the staking cavities between the slug and the open end of the barrel. Where tabs are formed on the panel slug, as described above, the tabs are simultaneously deformed against the inside surface of the barrel portion, forming a very secure interlock between the barrel portion and the panel slug, preventing inadvertent removal of the panel slug.

The method and improved die button of this invention therefore eliminate the problem of inadvertent removal of the panel slug, including installations in relatively thin panels. The panel slug is automatically staked in the barrel portion during installation, eliminating the requirement for a separate step. The staking of the panel slug in the barrel portion is performed by the die button, without any substantial increase in cost and without materially affecting the strength of the die button or the integrity of the fastener and panel assembly. Other advantages and meritorious features of the present invention will be more fully understood from the description of the preferred embodiments, the appended claims and the drawings, a brief description of which follows.

DETAILED DESCRIPTION OF THE PREFERRED EMBODIMENTS OF THE INVENTION

Figure 1:
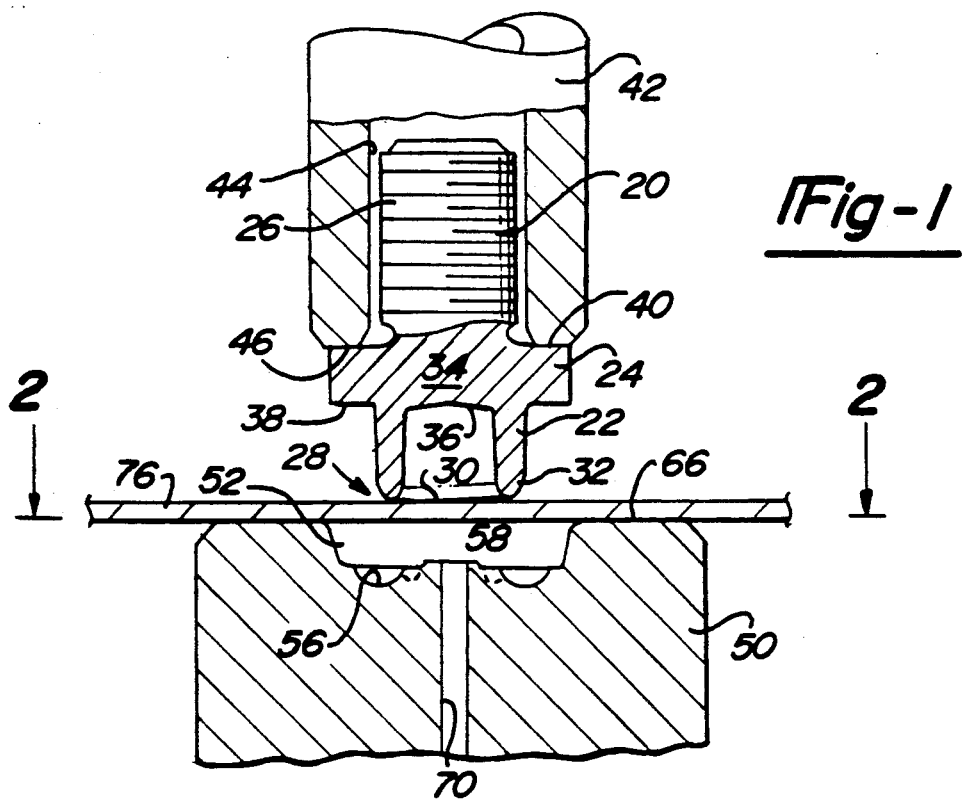
FIG. 1 is a side partially cross-sectioned view of a self-piercing and riveting fastener and die member of this invention prior to installation.

As described above, the disclosed self-piercing and riveting fastener and the improved female die member of this invention is particularly adapted for mass production applications, including automotive applications. The self-piercing and riveting fastener 20 illustrated in the drawings is a stud fastener of the type disclosed in the above-referenced U.S. Pat. No. 4,555,838; however, the improved method of attaching a self-piercing and riveting fastener and improved female die member of this invention is not limited to the configuration of the fastener. Further, the use of the term "fastener" is not intended to be limited to a fastening element which is adapted for attaching the panel to a structural element by a female fastener or the like.

The self-piercing and riveting fastener utilized in the method of this invention is intended for permanent attachment to a plate or panel, particularly a metal sheet or the like, such as utilized by the automotive industry for body panels and component parts. As described in the above-referenced patents, the self-piercing and riveting fastener disclosed herein is particularly suitable for installation in a conventional die press, such as utilized by the automotive industry to form sheet metal parts, including body panels and structural components. In such applications, the press installs one or more fastening elements with each stroke of the press, wherein the fastener element becomes a permanent part of the panel. As used herein, "panel" refers to any plate, panel or metal sheet having a thickness thin enough to permit piercing of the panel with the fastening element as described herein. The self-piercing and riveting fastener may also be utilized in any application where rivets are presently used, such as securing panels together and closures. The method and improved die button of this invention is particularly adapted for retaining the panel slug pierced from the panel by the self-piercing and riveting fastener in the barrel portion of the fastener, as now described.

The disclosed embodiment of the self-piercing and riveting fastener 20 includes a barrel portion 22 and a body portion including a radial flange portion 24 and a stud portion 26. In the disclosed embodiment, the stud portion 26 is externally threaded; however, the stud portion may be smooth or any other configuration, including the stud portion of a ball joint.

The barrel portion 22 includes a free end 28 having a chamfered piercing surface 30 and an arcuate annular outer surface 32. As described in the above-referenced U.S. Pat. No. 4,555,838, the frusto-conical piercing surface 30 in combination with the arcuate annular surface 32 provides important advantages in a self-piercing and riveting fastener of the type disclosed herein. However, the method and improved female die member of this invention are not limited to the configuration of the free end of the barrel portion. In the disclosed embodiment, the flange portion 24 bridges the barrel portion providing a bottom wall 34 having a concave internal surface 36 and defining an open-ended socket. Further, the flange portion 24 includes a radial annular surface 38 adjacent the barrel portion 22, sometimes referred to as the pressing surface, and a radial annular surface 40 adjacent the stud portion 26, sometimes referred to as the driven surface.

Where the self-piercing and riveting fasteners 20 are installed in a die press, as described above, the fasteners are normally fed to an installation head (not shown) which is attached to one platen of the die press. The installation head includes a plunger 42 which in the disclosed embodiment includes an axial bore 44 which receives the stud portion 26 of the fastener. The plunger includes an annular driving surface 46 which is driven against the annular driven surface 40 of the flange portion of the fastener. A female die member or die button 50 is normally attached in the opposite die platen (not shown) in coaxial alignment with the plunger 42. U.S. Pat. No. 4,555,838 includes further disclosures of suitable embodiments of installation heads adapted for installing self-piercing and riveting fasteners of the type described herein. For the purposes of this disclosure, however, it is sufficient to state that the plunger 42 is driven toward the die member 50 with sufficient force to install the fastener in a panel supported on the female die member, as described below.

Figure 2:
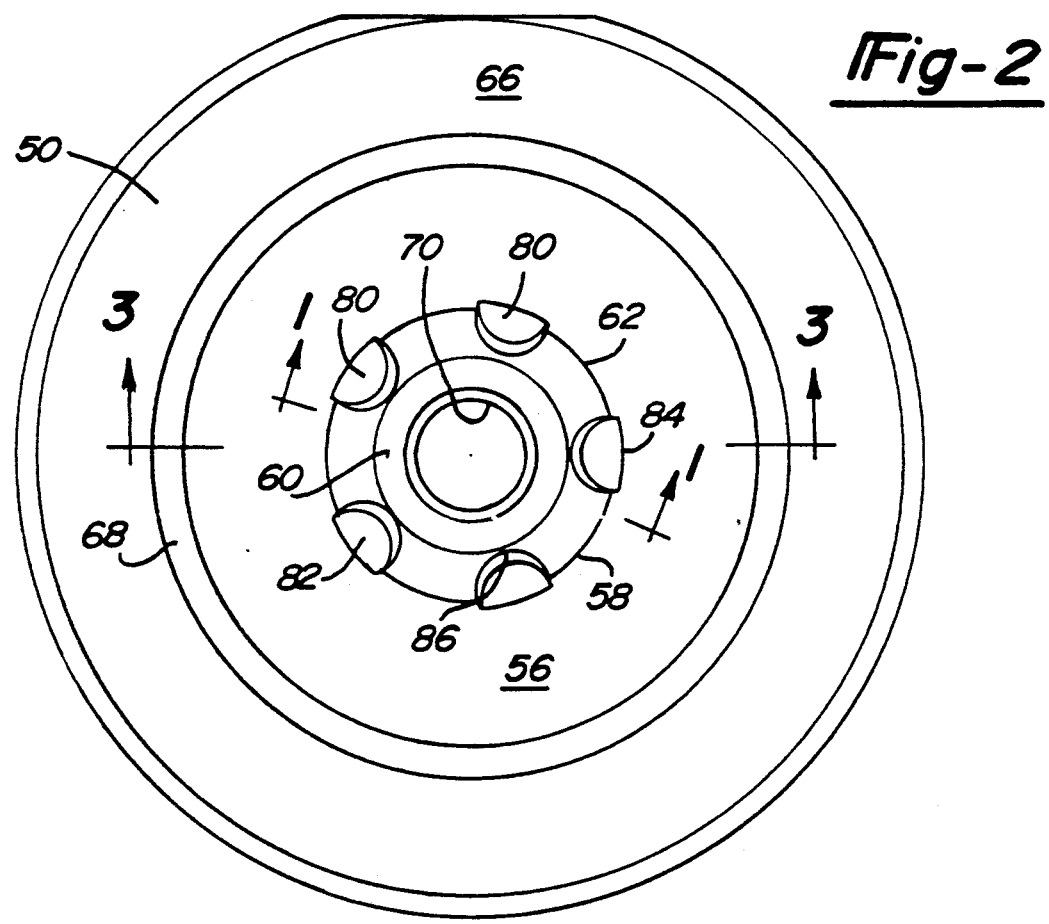
FIG. 2 is a top view of one embodiment of the improved female die member of this invention in the direction of view arrows 2—2 in FIG. 1.
Figure 3:
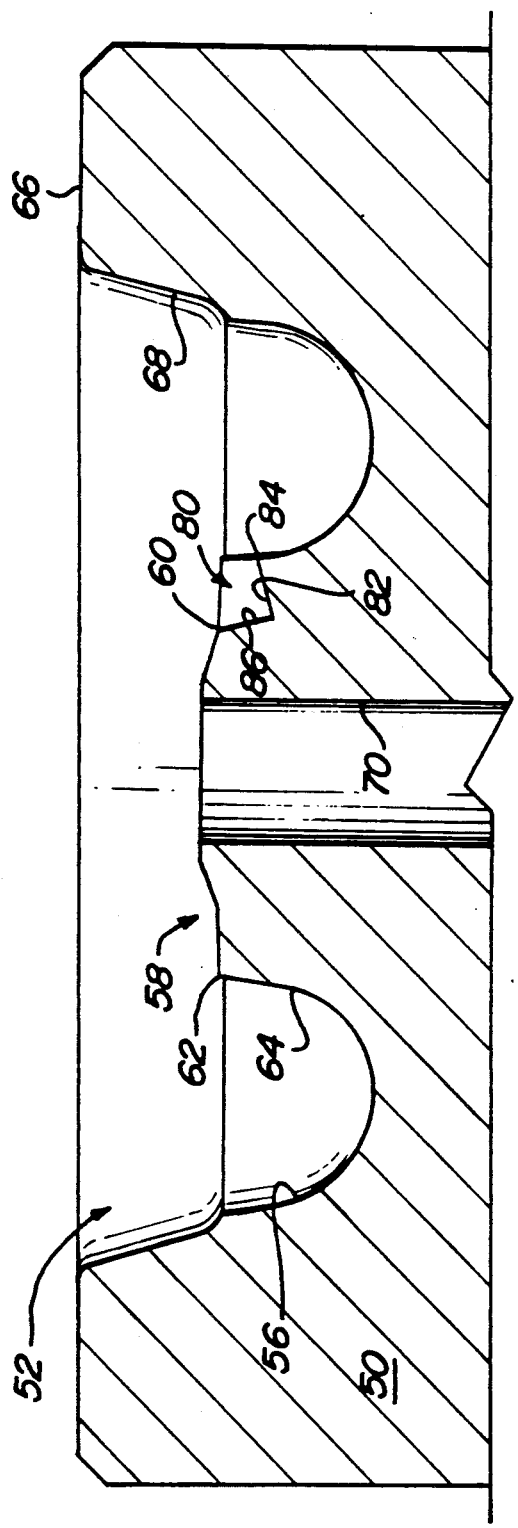
FIG. 3 is a cross-sectioned side view of the die member shown in FIG. 1 in the direction of view arrows 3—3 in FIG. 2.
Figure 4:
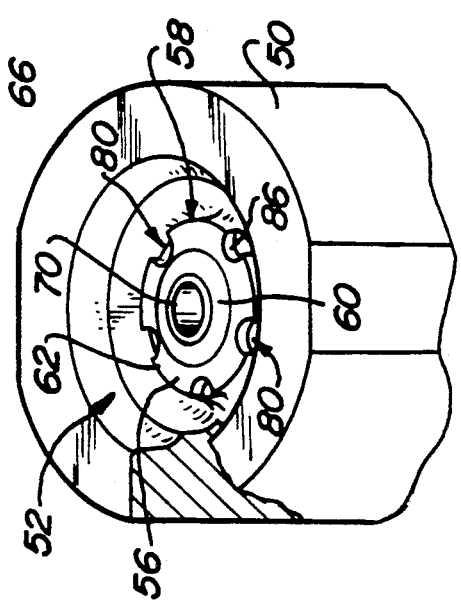
FIG. 4 is a top perspective view of the die member shown in FIG. 3.

Details of the improved female die member or die button 50 are best shown in FIGS. 2 to 4. As shown, the female die member includes a die cavity 52, including an annular concave die surface 56 surrounding a center die post 58. The die post 58 includes a free end 60 having a piercing surface 62 at its outer peripheral edge. As shown, the piercing surface 62 is relatively sharp to cooperate with the frusto-conical piercing surface 30 of the barrel portion 22 to pierce a panel. Other configurations of piercing surface may, however, be used. The outer surface 64 of the die post preferably tapers radially outwardly and, in the disclosed embodiment, smoothly blends into the annular concave die cavity 56. In the disclosed embodiment, the outer surface 64 of the center post 58 is conical and tapers radially outwardly at an angle of about 7 degrees until it blends into the arcuate concave surface 56 of the annular die cavity. As will be understood by those skilled in the art, the surface of the annular arcuate concave die cavity 56 is preferably smooth to control the radial outward deformation of the barrel portion as described below. The die button 50 further includes an annular bearing surface 66 which surrounds the die cavity 52, and the die cavity includes an inwardly tapered die surface 68 which receives and supports the panel during deformation of the panel as also described below. The panel 76 is supported on the annular bearing surface 66 during installation of the self-piercing and riveting fastener 20. In actual operation, the panel should be securely clamped to prevent relative movement of the panel 76 and the die member 50.

The preferred embodiment of the female die member of this invention includes a plurality of staking cavities 80 which preferably extend through the free end 60 of the center post 58 and open radially outwardly as best shown in FIG. 4. Each staking cavity includes a bottom surface 82 which intersects the radially outwardly tapered surface 64 of the die post to defined a cutting edge 84. In the most preferred embodiment, the bottom surfaces 82 of the die cavities 80 are angled radially upwardly toward the die post piercing surface as shown to define a sharp cutting edge 84. The die cavities 80 further include an inside surface 86 which is preferably arcuate and most preferably semicircular as shown in FIGS. 2 and 4. The inside surface 86 is also preferably tapered or angled toward the axis of the central die post 58 at its free end 60 as shown in FIG. 3. This draft angle assures release of the staking ribbons formed in the die cavities and assists in filling the cavities in the staking method of this invention described below.

Figure 5:
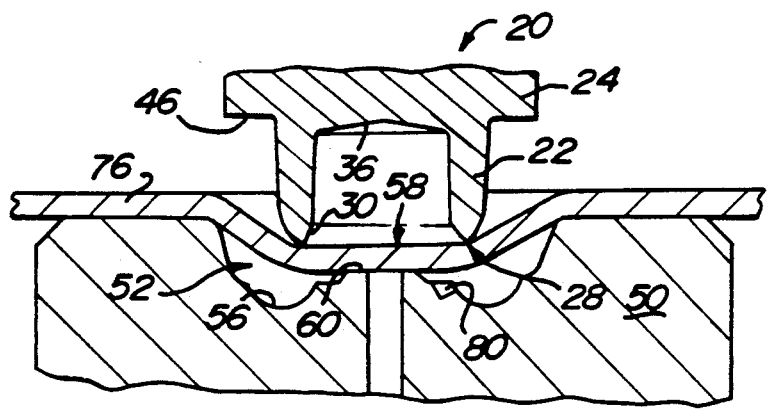
FIGS. 5-9 are cross-sectional side views illustrating the sequence of installation of the self-piercing and riveting fastener in a panel with the improved die button shown in FIG. 1.

FIGS. 5-9 illustrate the preferred sequence of installation of a self-piercing and riveting fastener and the method of staking the panel slug in the barrel portion of this invention. As shown in FIG. 5, the free end 28 of the barrel portion 22 is driven into the panel 76, and the panel is thus driven against the free end 60 of the die post of the female die member 50. In the disclosed embodiment, the female die member includes an axial relief port 70 which permits removal of air which would otherwise be entrapped between the panel 76 and the free end 60 of the die post.

Figure 6:
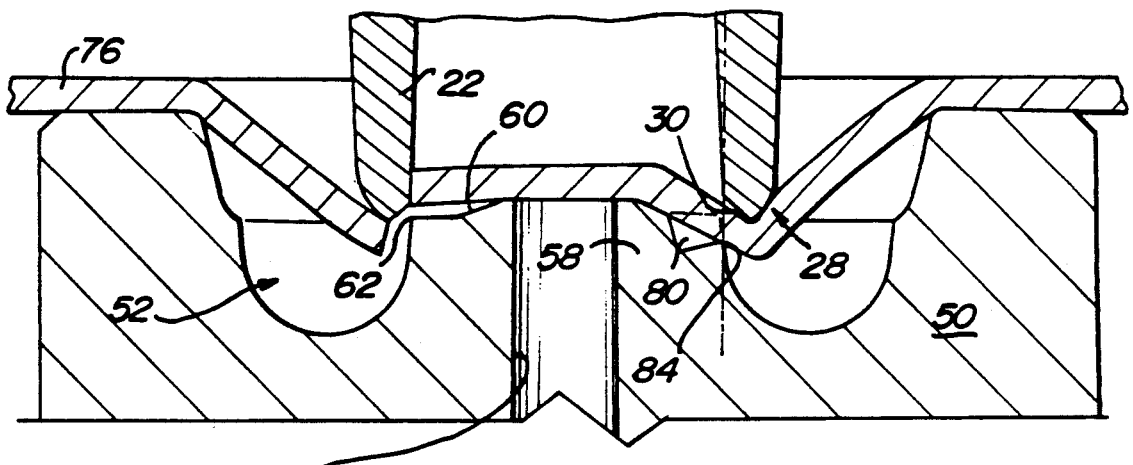
Figure 7:
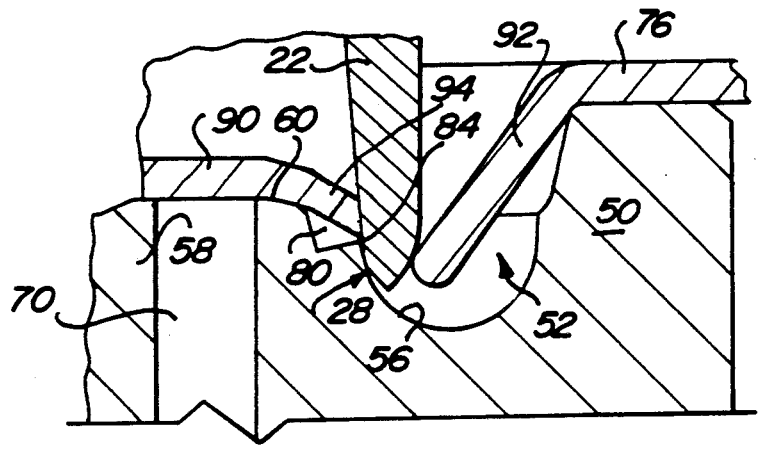
Figure 11:
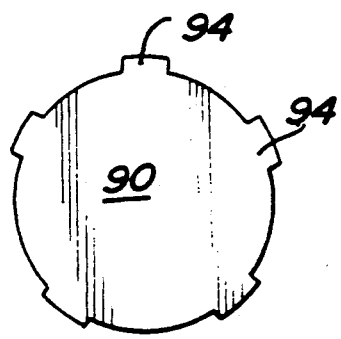
FIG. 11 is a top view of the panel slug formed by the self-piercing and riveting member and die member illustrated in FIG. 9 as it would be depicted if removed from the fastener and flattened.

As the free end 28 of the barrel portion is further driven into the panel, the piercing surfaces 62 and 30 of the die post 58 and the barrel portion 22, respectively, pierce the panel as shown at the left in FIG. 6. The panel is not, however, pierced at the staking cavities 80 because the staking cavities 80 interrupt the piercing surface 62 of the die post as best shown in FIGS. 2 and 4. Thus, the panel is not pierced by the piercing surface 62 at the staking cavities as shown on the right in FIG. 6. Instead, the panel is further driven into the annular die cavity 52 forming radially extending unpierced portions of the panel overlying the staking cavities 80 interconnected with the main panel 76. As the barrel portion free end 28 is further driven into the die cavity 52, the radially extending unpierced portions of the panel overlying the staking cavities 80 are sheared by the cutting edges 84 as shown in FIG. 7. A separate slug 90 is thus pierced from the panel in two stages, resulting in a generally circular slug 90 having radially extending tabs 94 as best shown in FIG. 11. It will be understood, however, that the configuration of the slug will be dependent upon the shape of the tubular barrel portion 22 which need not be circular. For example, the tubular barrel portion 22 could be polygonal, wherein the die post 58 and die cavity 52 would be polygonal and configured to receive the barrel portion.

The portion 92 of the panel 76 adjacent the pierced panel opening is simultaneously driven into the die cavity 52, and the panel slug 90, which is received on the free end of the die post 60, is driven into the barrel portion 22. As will be understood, the diameter of the panel slug 90, excluding the radial tabs 94, will be substantially equal to or slightly greater than the internal diameter of the barrel portion 22. Thus, the tabs 94 are simultaneously deformed against the internal surface of the barrel portion 22 because the diameter of the slug 90 plus the tabs 94 is greater than the internal diameter of the barrel portion 22.

Figure 8:
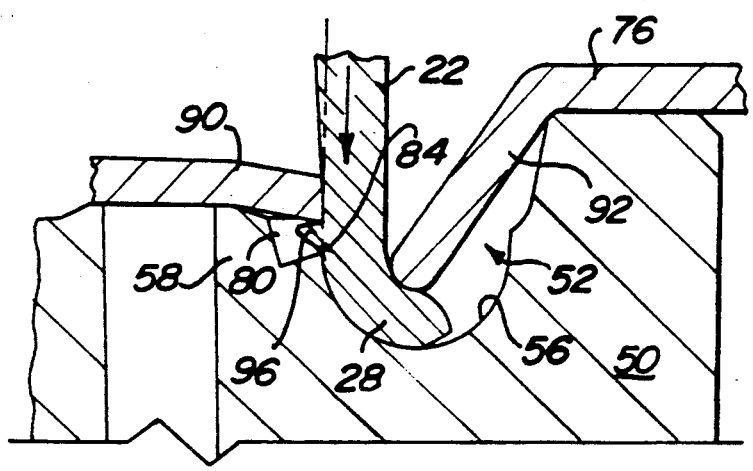
Figure 9:
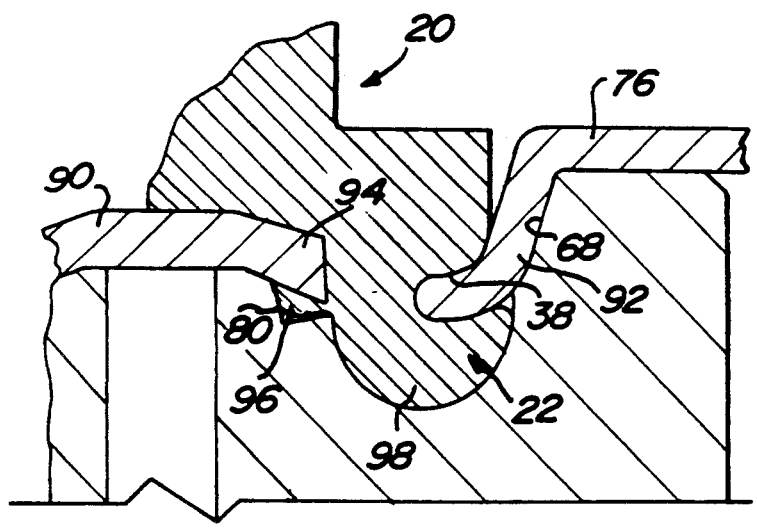

As the free end 28 of the barrel portion is driven further into the die cavity 52, it is received against the concave annular die surface 56 of the die cavity and deformed radially outwardly as shown in FIG. 8. Simultaneously, the cutting edges 84 of the die cavities 80 begin to shear an integral ribbon 96 from an inside surface of the barrel portion 22 as shown in FIG. 8. The panel portion 92 adjacent the pierced panel opening is simultaneously driven into the developing U-shaped channel 98 at the free end 28 of the barrel portion 22 as shown in FIGS. 8 and 9, forming a secure mechanical interlock between the barrel portion 22 and the panel portion 92 entrapped within the U-shaped channel 98.

Figure 10:
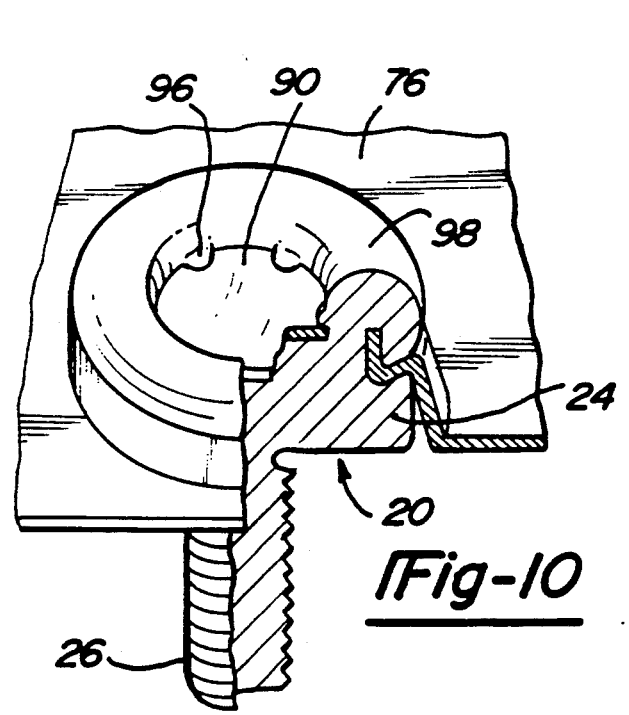
FIG. 10 is a bottom partially cross-sectioned perspective view of the installation of the self-piercing and riveting fastener of FIG. 1 in a panel.

The integral staking ribbons 96 sheared from the inside surface of the barrel portion 22 are radially deformed in the staking cavities 80, substantially filling the cavities and forming semicircular ribbons 96 integral with the barrel portion, securely staking the panel slug 90 in the barrel portion, as best shown in FIG. 10.

Thus, the panel slug 90 is securely retained in the barrel portion 22 by two independent means. First, the radially extending tabs 94 on the panel slug 90 are driven into and deformed against an inside surface of the barrel portion 22. Second, integral ribbons 96 are sheared from an inside surface of the barrel portion 22 and deformed radially inwardly into the staking cavities 80, forming radially inwardly extending integral ribbons 96 which entrap the panel slug 90 in the barrel portion. The difficulty of retaining the panel slug 90 in the barrel portion 22 is somewhat dependent upon the thickness of the panel 76. Where the panel thickness is greater than 0.120 inches, for example, the radial tabs 94 on the panel slug may be sufficient to retain the slug in the barrel portion. Where, however, the panel thickness is relatively thin, for example, less than 0.040 inches, the inwardly directed radial ribbons 96 integral with the barrel portion may be necessary, particularly where the assembly is subject to vibration. The radial staking ribbons 96 may be eliminated by dimensioning the barrel portion relative to the diameter of the die post 58, such that the cutting edges 84 do not cuttingly engage the inside surface of the barrel portion. That is, the barrel portion 22 has a greater internal diameter than the radially outwardly tapered surface 64 of the die post.

Having described the preferred method of attaching a self-piercing and riveting fastener and the improved die button of this invention, it will be understood that various modifications may be made within the purview of the appended claims. The dimensions of the self-piercing and riveting fasteners will depend upon the particular application and panel thickness. As described above, however, the method and improved die button of this invention is particularly suitable for permanent attachment of self-piercing and riveting fasteners to relatively thin panels, such as utilized for body and structural components in the automotive and appliance industries. As will be understood, the self-piercing and riveting fastener disclosed herein is preferably formed of a deformable metal, preferably steel, which may be heat-treated for surface hardness, ductility, etc. A suitable material for the self-piercing and riveting fasteners disclosed herein is typically medium carbon steels, including SAE 1022, 1023 and 1030 steels. Reference may also be made to the above-referenced U.S. patents for further information regarding suitable installation apparatus, self-piercing and riveting fasteners and methods of installation.

What is claimed is:

1. A method of attaching a self-piercing and riveting fastener to a panel, said fastener including an annular barrel portion having a free open end and a piercing surface adjacent said free end, said method comprising the following steps:
    (a) driving said fastener barrel portion free end against said panel, piercing a slug from said panel, and forming an opening through said panel;
    (b) driving said barrel portion free end through said panel opening and deforming said free end of said barrel portion radially outwardly, riveting said barrel portion to said panel; and
    (c) simultaneously driving said panel slug into said barrel portion through said free open end and shearing a ribbon from an internal surface of said barrel portion, said ribbon remaining integral with said barrel portion and staking said panel slug in said barrel portion.

2. The method of attaching a self-piercing and riveting fastener to a panel as defined in claim 1, wherein said method includes shearing a plurality of circumferentially spaced ribbons from said barrel portion inside surface integral with said barrel portion, staking said panel slug in said barrel portion.

3. The method of attaching a self-piercing and riveting fastener to a panel as defined in claim 2, wherein said method includes deforming said ribbons radially inwardly into arcuate ribbons located between said slug and said open free end of said barrel portion, staking said slug in said barrel portion.

4. The method of attaching a self-piercing and riveting fastener to a panel as defined in claim 2, wherein said panel is pierced in two stages, first along said barrel portion piercing surface interrupted at locations adjacent said ribbons, and second at said ribbons spaced radially outwardly of said barrel portion piercing surface forming spaced tabs on said panel slug, then deforming said tabs of said slug against an inside surface of said barrel portion, securely staking said slug in said barrel portion.

5. The method of attaching a self-piercing and riveting fastener to a panel as defined in claim 2, wherein said barrel portion includes a bottom wall spaced from said free end forming a socket, said method including driving said panel slug toward said barrel portion bottom wall and deforming said ribbons radially inwardly adjacent said slug, securely staking said slug adjacent said bottom wall.

6. A method of attaching a self-piercing and riveting fastener to a panel, said fastener including an annular barrel portion having a free open end and a piercing surface adjacent said free end, said method comprising the following steps:
    (a) driving said fastener barrel portion free end against said panel and piercing a slug from said panel in two stages, including first piercing said panel at said barrel portion piercing surface interrupted at predetermined spaced locations forming radially extending tabs on said slug, then severing said radial tabs and forming an opening through said panel;
    (b) driving said barrel portion free end through said panel opening and deforming said free end radially outwardly, riveting said barrel portion to said panel; and
    (c) simultaneously driving said panel slug into said barrel portion through said free end and deforming said panel slug tabs against an internal surface of said barrel portion, staking said panel slug in said barrel portion.

7. The method of attaching a self-piercing and riveting fastener to a panel as defined in claim 6, wherein said method includes shearing a plurality of circumferentially spaced ribbons from said barrel portion internal surface simultaneously while driving said panel slug into said barrel portion, then deforming said ribbons radially inwardly to stake said panel slug in said barrel portion.

8. The method of attaching a self-piercing and riveting fastener to a panel as defined in claim 7, wherein said method includes deforming said ribbons radially inwardly between said slug and said barrel portion free open end, staking said slug in said barrel portion.

9. A method of attaching a self-piercing and riveting fastener to a panel, said fastener including an annular barrel portion having a free open end and a piercing surface adjacent said free end, said method comprising the following steps:
    (a) supporting said panel over a die member, said die member having an annular concave die cavity configured to receive said fastener annular barrel portion surrounding a projecting central die post, said central die post having a free end including an outer piercing surface configured to be received in said barrel portion free open end and an outer surface sloping radially outwardly into said die cavity, and said outer surface of said die post having a plurality of circumferentially spaced cutting edges spaced radially outwardly from said piercing surface of said die post;
    (b) driving said barrel portion free end against said panel in coaxial alignment with said die member central die post, piercing a slug from said panel which is received on said die post free end and forming an opening through said panel; and
    (c) continuing to drive said barrel portion free open end through said panel opening over said central die post into said annular die cavity, said cutting edges on said outer surface of said central die post each cutting a ribbon from an inside surface of said annular barrel portion remaining integral with said barrel portion as said barrel portion is deformed radially outwardly in said annular die cavity riveting said barrel portion to said panel, said ribbons preventing inadvertent removal of said panel slug from said barrel portion.

10. The method of attaching a self-piercing and riveting fastener to a panel as defined in claim 9, wherein said outer surface of said die post includes a plurality of circumferentially spaced staking cavities defined in said die post free end opening radially outwardly, said staking cavity openings including said cutting edges, said method including deforming said integral barrel ribbons radially inwardly into said staking cavities, staking said panel slug in said barrel portion.

11. The method of attaching a self-piercing and riveting fastener to a panel as defined in claim 10, wherein said staking cavities include an arcuate inside surface opening radially outwardly, said method including deforming said integral barrel ribbons radially inwardly into U-shaped staking ribbons staking said panel slug in said barrel portion.

12. The method of attaching a self-piercing and riveting fastener to a panel as defined in claim 10, wherein staking cavities are defined through said die post outer piercing surface interrupting said piercing surface, said method including piercing a slug from said panel in two stages, including first piercing said panel between said piercing surfaces of said fastener annular barrel portion and said central die post, then completing the piercing of said slug at said cutting edges forming radial tabs on said panel slug, then deforming said tabs against an internal surface of said barrel portion, securely staking said slug in said annular barrel portion.

13. The method of attaching a self-piercing and riveting fastener to a panel as defined in claim 9, wherein said barrel portion includes a bottom wall spaced from said free end forming a socket, said method including driving said panel slug adjacent said bottom wall and deforming said ribbons radially inwardly and toward said slug, securely staking said slug adjacent said bottom wall.

14. A method of attaching a self-piercing and riveting fastener to a panel, said fastener including an annular barrel portion having a free open end and a piercing surface adjacent said free end, said method comprising the following steps:

(a) supporting said panel over a die member, said die member having an arcuate concave die cavity configured to receive said fastener annular barrel portion surrounding a projecting central die post, said central die post having a free end including an outer piercing surface configured to be received in said barrel portion free open end and an outer surface sloping radially outwardly into said annular concave die cavity, and said outer surface of said die post having a plurality of circumferentially spaced cutting edges spaced radially outwardly from said piercing surface of said die post;

(b) driving said barrel portion free end against said panel in coaxial alignment with said die member central die post piercing a slug from said panel in two stages, including first piercing said panel between said piercing surfaces of said barrel portion free end and said die post interrupted at said circumferentially spaced cutting edges forming radially extending tabs on said panel slug, then said spaced cutting edges severing said tabs and forming an opening through said panel;

(c) continuing to drive said barrel portion free open end through said panel opening into said annular die cavity, deforming said barrel portion free end radially outwardly in said annular die cavity, riveting said barrel portion to said panel; and (d) simultaneously driving said panel slug into said barrel portion through said free open end and deforming said panel slug radial tabs against an internal surface of said barrel portion staking said slug in said barrel portion.

15. The method of attaching a self-piercing and riveting fastener to a panel as defined in claim 14, wherein said method further includes driving said barrel portion free open end over said die post into said annular die cavity, said cutting edges on said outer surface of said central die post each cutting a ribbon from an inside surface of said annular barrel portion integral with said barrel portion as said barrel portion is deformed radially outwardly in said die cavity riveting said barrel portion to said panel.

16. The method of attaching a self-piercing and riveting fastener to a panel as defined in claim 15, wherein said method includes deforming said integral barrel ribbons radially inwardly, staking said panel slug in said barrel portion.

17. The method of attaching a self-piercing and riveting fastener as defined in claim 16, wherein said method includes deforming said ribbons radially inwardly into U-shaped staking ribbons staking said panel in said barrel portion.

\* \* \* \* \*